United States Patent
Watanabe

(10) Patent No.: US 10,915,279 B2
(45) Date of Patent: Feb. 9, 2021

(54) PRINTING APPARATUS

(71) Applicant: SEIKO EPSON CORPORATION, Tokyo (JP)

(72) Inventor: Ikumi Watanabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/700,653

(22) Filed: Dec. 2, 2019

(65) Prior Publication Data

US 2020/0174728 A1 Jun. 4, 2020

(30) Foreign Application Priority Data

Dec. 3, 2018 (JP) ................................ 2018-226195

(51) Int. Cl.
| | | |
|---|---|---|
| *G06F 15/00* | (2006.01) | |
| *G06F 3/12* | (2006.01) | |
| *G06K 1/00* | (2006.01) | |
| *B65H 7/10* | (2006.01) | |

(52) U.S. Cl.
CPC ............. *G06F 3/1256* (2013.01); *B65H 7/10* (2013.01); *G06F 3/1257* (2013.01); *G06F 3/1273* (2013.01); *B65H 2405/11425* (2013.01); *B65H 2511/12* (2013.01)

(58) Field of Classification Search
CPC .... G06F 3/1256; G06F 3/1257; G06F 3/1273; B65H 7/10; B65H 1205/11425; B65H 2511/12

USPC ........................................ 358/1.15, 1.1, 1.13
See application file for complete search history.

(56) References Cited

U.S. PATENT DOCUMENTS

| | | | |
|---|---|---|---|
| 5,689,759 A | 11/1997 | Canon | |
| 2010/0172684 A1* | 7/2010 | Nakagawa | B65H 3/0661 400/579 |
| 2013/0214478 A1* | 8/2013 | Yoshida | B65H 1/04 271/145 |
| 2015/0224797 A1* | 8/2015 | Ogimura | B41J 11/06 347/16 |
| 2017/0139364 A1* | 5/2017 | Takahashi | B65H 1/14 |
| 2018/0275567 A1* | 9/2018 | Kashihara | G03G 15/16 |

FOREIGN PATENT DOCUMENTS

JP H06-148990 5/1994

* cited by examiner

*Primary Examiner* — Douglas Q Tran
(74) *Attorney, Agent, or Firm* — Workman Nydegger

(57) ABSTRACT

A printing apparatus has: a paper tray having edge guides, each of which can guide one edge of paper in its width direction intersecting the transport direction of the paper; a paper width sensor that detects a paper width allowable in the paper tray according to the positions of the edge guides; a display controller that displays, on a display unit, a paper size selection screen on which candidate paper sizes corresponding to the paper width detected by the paper width sensor are displayed; and a selected size storage section that stores, in a storage section, paper selection information in which the paper width and the paper size selected on the paper size selection screen are related to each other.

10 Claims, 7 Drawing Sheets

| PAPER SIZE CLASSIFICATION | PAPER WIDTH SENSOR | PAPER LENGTH SENSOR | DEFAULT SIZE | CANDIDATE SIZE |
|---|---|---|---|---|
| D1 | 0 | 0 | L SIZE | L SIZE |
| D2 | 0 | 1 | NONE | NOT APPLICABLE |
| D3 | 0 | 0 | A6 | A6, POSTCARD, B6 |
| D4 | 0 | 1 | NONE | NOT APPLICABLE |
| D5 | 1 | 0 | A5 | A5, B5 |
| D6 | 1 | 1 | A4 (LANDSCAPE) | A4 (LANDSCAPE), LETTER (LANDSCAPE) |
| D7 | 1 | 0 | A4 (PORTRAIT) | A4 (PORTRAIT), LETTER (PORTRAIT) |
| D8 | 1 | 1 | A3 | A3, SUPER A3 |

| PAPER SIZE CLASSIFICATION | PRINT HISTORY INFORMATION |
|---|---|
| D1 | L SIZE: aa TIMES/WEEK |
| D2 | — |
| D3 | A6: bb TIMES/WEEK, POSTCARD: cc TIMES/WEEK, B6: dd TIMES/WEEK |
| D4 | — |
| D5 | A5: ee TIMES/WEEK, B5: ff TIMES/WEEK |
| D6 | A4 (LANDSCAPE): gg TIMES/WEEK, LETTER (LANDSCAPE): hh TIMES/WEEK |
| D7 | A4 (PORTRAIT): ii TIMES/WEEK, LETTER (PORTRAIT): jj TIMES/WEEK |
| D8 | A3: kk TIMES/WEEK, SUPER A3: mm TIMES/WEEK |

PRINTING APPARATUS

The present application is based on, and claims priority from JP Application Serial Number 2018-226195, filed Dec. 3, 2018, the disclosure of which is hereby incorporated by reference herein in its entirety.

BACKGROUND

1. Technical Field

The present disclosure relates to a printing apparatus.

2. Related Art

A conventional printing apparatus having a manual feed tray detects a position at which a paper restriction guide of the manual feed tray is set, and recognizes candidate paper sizes for paper to be manually fed. The printing apparatus then indicates the recognized candidate paper sizes on a display portion on a manipulation panel. When the user selects a paper size from the candidate paper sizes, the printing apparatus identifies the size of paper to be manually fed in response to the user's selection.

A printing apparatus described in, for example, JP-A-6-148990 detects a width set by a paper restriction guide of a manual feed tray, and indicates candidate paper sizes on a size selection screen according to the detected value. When the user selects a paper size on the size selection screen, the printing apparatus stores the selected paper size in a buffer. The printing apparatus displays the size selection screen in a state in which the paper size stored in the buffer remains selected, until the user selects another paper size.

The printing apparatus in JP-A-6-148990 displays the size selection screen on which news candidate paper size selected according to a change in the width set by the paper restriction guide are indicated. When the user changes the width set by the paper restriction guide, therefore, candidate paper sizes different from the candidate paper sizes before the change are indicated on the size selection screen. When the user selects any paper size from the candidate paper sizes, the candidate paper size stored in the buffer is updated with the selected paper size. Since information about the paper size stored in the buffer is updated in this way, when the user restores the width set by the paper restriction guide to the previous width, the information about the previous paper size is no longer stored.

Therefore, it is not possible for the printing apparatus to display the size selection screen in a state in which the previous paper size is selected, with reference to the information stored in the buffer. The printing apparatus only displays the size selection screen on which candidate paper sizes based on the width restored by the paper restriction guide are indicated. In this case, the user has to select the paper size again that the user selected before, which is a cumbersome manipulation for the user, making the usability of the printing apparatus bad.

SUMMARY

As an aspect that may solve the above problem, a printing apparatus having a display unit includes: a paper tray having an edge guide that guides one edge of paper in its width direction intersecting the transport direction of the paper; a detector configured to detect a paper width allowable in the paper tray according to the position of the edge guide; a display controller configured to display, on the display unit, a paper size selection screen on which a plurality of candidate paper sizes corresponding to the paper width detected by the detector are displayed; and a storage section configured to store paper selection information in which the paper width and a paper size selected on the paper size selection screen are related to each other.

In the above printing apparatus, when the paper width detected by the detector is switched from a first paper width to a second paper width, the display controller may display, on the display unit, the paper size selection screen corresponding to the second paper width. When second paper selection information related to the second paper width is stored in the storage section, the display controller may display, on the display unit, the paper size selection screen corresponding to the second paper width in a manner in which a paper size related to the second paper width in the second paper selection information is preferentially displayed over another candidate paper size.

In the above printing apparatus, when the paper width detected by the detector is a third paper width and the display controller accepts a command to display the paper size selection screen in a state in which third paper selection information related to the third paper width is stored in the storage section, the display controller may display, on the display unit, the paper size selection screen corresponding to the third paper width in a manner in which a paper size related to the third paper width in the third paper selection information is preferentially displayed over another candidate paper size.

In the above printing apparatus, when the paper width detected by the detector is a fourth paper width and fourth paper selection information related to the fourth paper width is not stored in the storage section, the display controller may display, on the display unit, the paper size selection screen corresponding to the fourth paper width in a manner in which an initial paper size, which is set in advance, is preferentially displayed over another candidate paper size.

In the above printing apparatus, when the paper width detected by the detector is the fourth paper width and the fourth paper selection information is stored, the display controller may display, on the display unit, the paper size selection screen corresponding to the fourth paper width in a manner in which a paper size related to the fourth paper width in the fourth paper selection information, the initial paper size, and another candidate paper size are is preferentially displayed in this order.

In the above printing apparatus, when the paper width detected by the detector is the fourth paper width, the fourth paper selection information is stored, and there is a match between the initial paper size and the paper size related to the fourth paper width in the fourth paper selection information, the display controller may not display the initial paper size on the paper size selection screen corresponding to the fourth paper width as a candidate paper size.

In the above printing apparatus, the storage section may be a non-volatile memory, and when initialization processing to restore the settings of the printing apparatus to its factory settings is executed, may delete the paper selection information stored in the storage section.

In the above printing apparatus, the storage section may be a volatile memory. When the printing apparatus is powered off or when the printing apparatus shifts to a power-saving mode and a power supply voltage to the storage section drops to or below a predetermined level, the paper selection information stored in the storage section may be deleted.

In the above printing apparatus, the storage section may store print history information in which the number of paper sheets supplied from the paper tray or the number of print jobs executed in response to paper supplied from the paper tray is recorded so as to be classified according to the paper width detected by the detector, a paper size selection frequency recognizer may be provided that recognizes the selection frequencies of the candidate paper sizes corresponding to the paper width with reference to the print history information, and the display controller may display the paper size selection screen on the display unit according to the selection frequencies of the candidate paper sizes, the selection frequencies being recognized by the paper size selection frequency recognizer, in a manner in which the paper size with the highest selection frequency is preferentially displayed over another candidate paper size.

In the above printing apparatus, when the paper width detected by the detector is switched from a first paper width to a second paper width, the display controller may display, on the display unit, the paper size selection screen corresponding to the second paper width, according to the print history information for the second paper width.

In the above printing apparatus, when the paper width detected by the detector is the third paper width and the display controller accepts a command to display the paper size selection screen, the display controller may display, on the display unit, the paper size selection screen corresponding to the third paper width according to the print history information for the third paper width.

An aspect that solves the above problem may be implemented by various forms other than the printing apparatus described above and a method of controlling the printing apparatus. For example, programs for a computer or a processor that implement the printing apparatus described above and a method of controlling the printing apparatus may be used. Alternatively, a recoding medium that records the programs described above, a server that distributes these programs, a transfer medium that transfers the programs, data signals that embody the programs in carrier waves, or the like may be used.

BRIEF DESCRIPTION OF THE DRAWINGS

FIG. 4 illustrates paper size classification in the MP tray.

FIG. 7 illustrates print history information.

DESCRIPTION OF EXEMPLARY EMBODIMENTS

1. Structure of a Printing Apparatus

Figure 1:
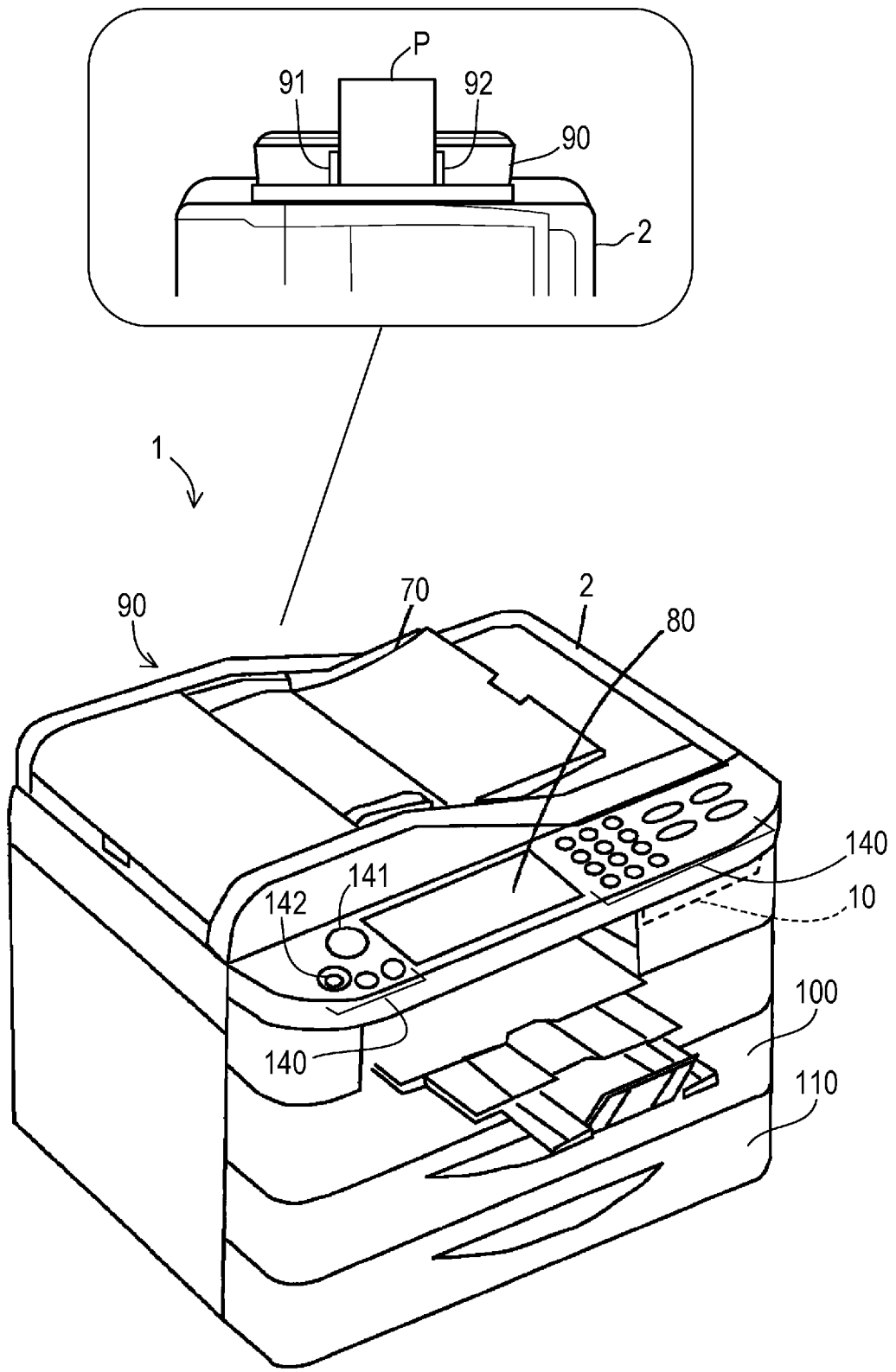
FIG. 1 illustrates the structure of the whole of a printing apparatus as well as a multi-purpose (MP) tray.

The structure of a printing apparatus 1 in an embodiment to which the present disclosure is applied will be described with reference to FIGS. 1 to 3. The printing apparatus 1 is a multi-function peripheral having a printer function, a facsimile (FAX) function, and a scanner function. The printing apparatus 1 has a scanner unit 70, a touch panel 80, button switches 140, an A-tray 100, and a B-tray 110. The scanner unit 70 is disposed on the top surface of a main body 2. The touch panel 80 and button switches 140 are disposed on the top of the front of the main body 2. The A-tray 100 and B-tray 110, which are of cassette type, are disposed at the front of the main body 2. The touch panel 80 is equivalent to an example of a display unit. The button switches 140 include a power switch 141 that generates a command to supply electric power to the main body 2 and a command to stop the supply of electric power as well as a standby switch 142 that generates a command to shift to a power-saving mode in which standby power to the main body 2 is reduced and a command to switch back from the power-saving mode. A printer unit 75 (see FIG. 3) and a main controller 10 (also see FIG. 3) that controls the overall operation of the printing apparatus 1 are provided in the main body 2.

The printing apparatus 1 further has a multi-purpose (MP) tray 90 disposed on the rear surface of the main body 2. The MP tray 90, which is a manual feed tray, has a left edge guide 91 and a right edge guide 92, each of which can guide one edge of set paper P in its width direction. The MP tray 90 is equivalent to an example of a paper tray. To set paper P in the MP tray 90, the user of the printing apparatus 1 draws the MP tray 90 and slides the left edge guide 91 and right edge guide 92 according to the width of paper P to be set in the MP tray 90 until the left edge guide 91 and right edge guide 92 abut the paper P.

Figure 2:
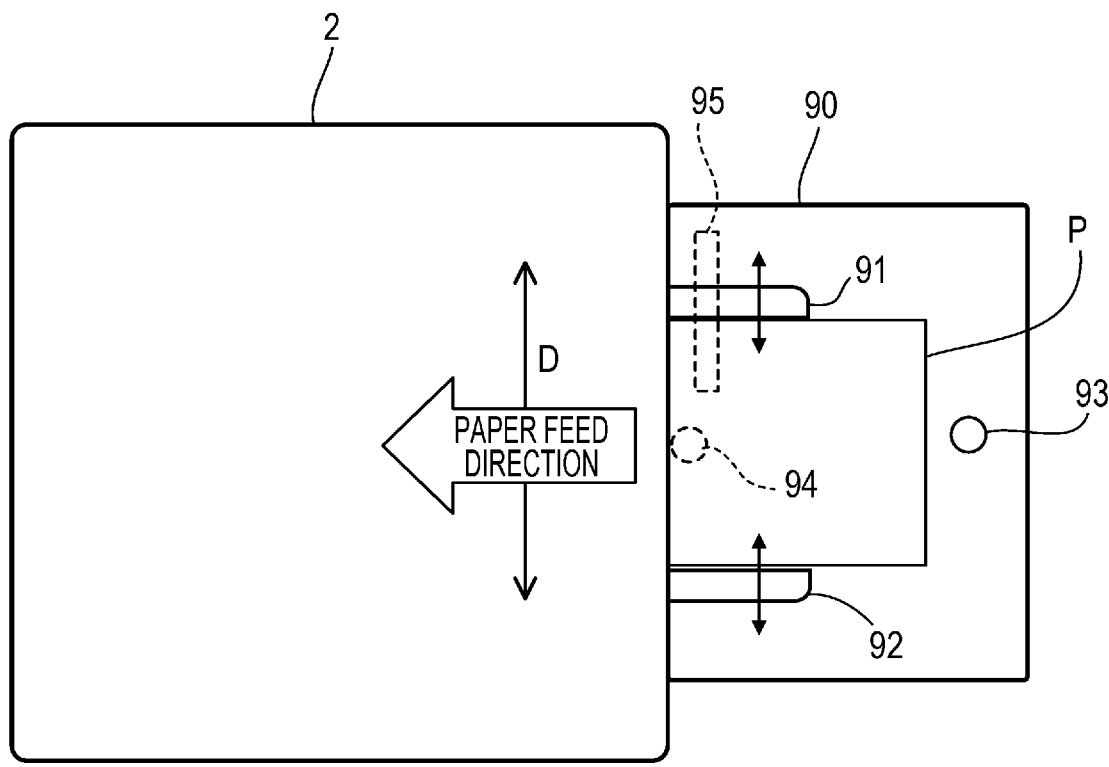
FIG. 2 illustrates the setting and detection of a paper size in the MP tray.

As illustrated in FIG. 2, the MP tray 90 has a paper length sensor 93 that detects that the length of the set paper P is equal to or larger than a predetermined length, and also has a paper presence/absence sensor 94 that detects whether paper P is present or absent. The MP tray 90 also has a paper width sensor 95 that detects a paper width allowable in the MP tray 90, according to the position at which the left edge guide 91 is set. The paper width sensor 95 is equivalent to an example of a detector. When manipulated by the user, the left edge guide 91 and right edge guide 92 slide together while maintaining the same distance in a D direction intersecting a transport direction in the MP tray 90 between the relevant slide and the center of the MP tray 90 in the D direction. The paper width sensor 95 detects the width of the paper P at one of four levels.

Figure 3:
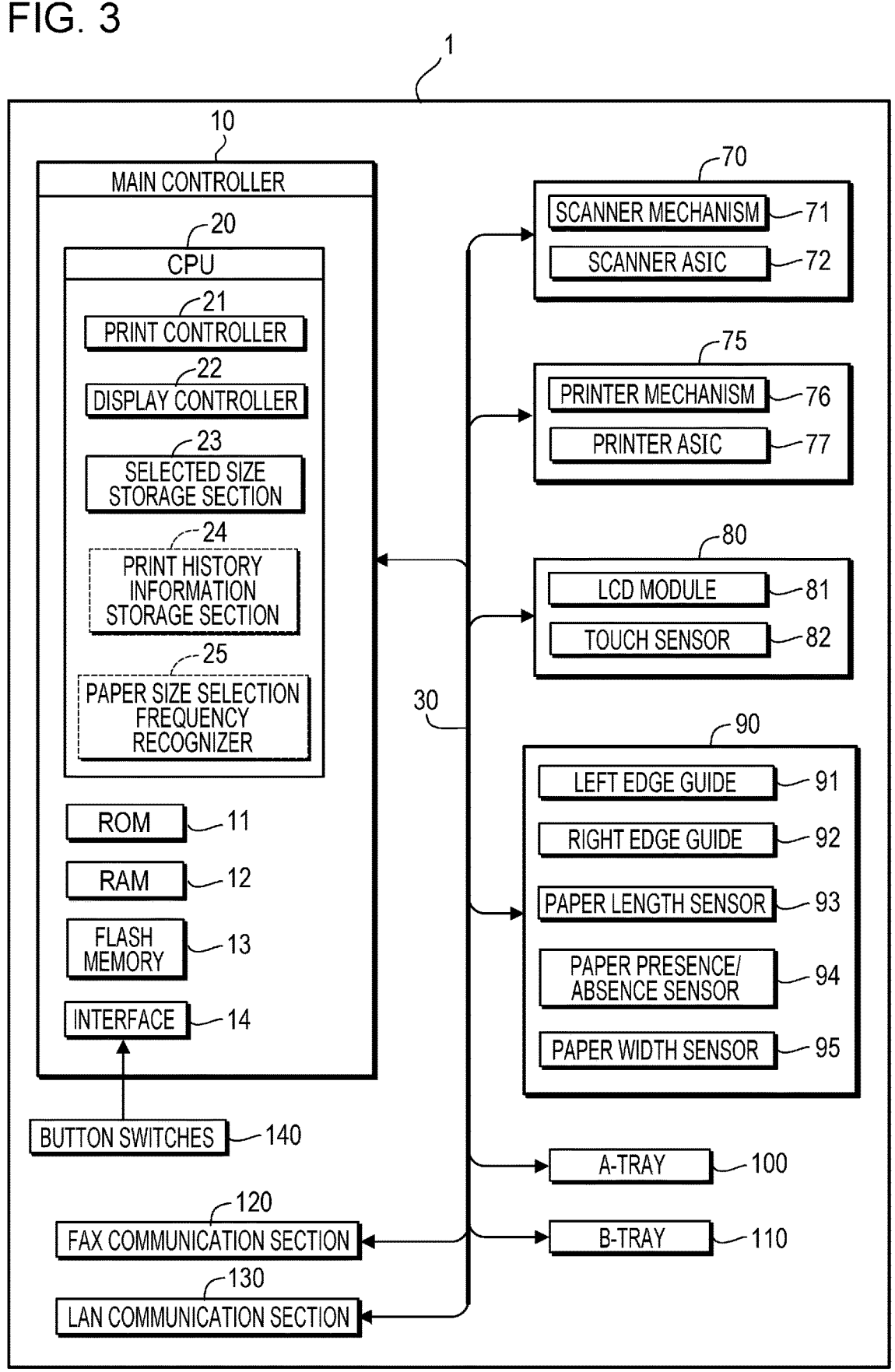
FIG. 3 is a control block diagram of the printing apparatus.

As illustrated in FIG. 3, the main controller 10 is coupled to the scanner unit 70, printer unit 75, touch panel 80, MP tray 90, A-tray 100, and B-tray 110 through a data bus 30. The main controller 10 recognizes the states of the scanner unit 70, printer unit 75, MP tray 90, A-tray 100, and B-tray 110, and controls their operations. The main controller 10 also recognizes the manipulation state of the touch panel 80 and controls a display on a screen.

The scanner unit 70 has a scanner mechanism 71 and a scanner application-specific integrated circuit (ASIC) 72. The scanner ASIC 72 controls the operation of the scanner mechanism 71 in response to a control signal sent from the main controller 10. The printer unit 75 has a printer mechanism 76 and a printer ASIC 77. The printer ASIC 77 controls the operation of the printer mechanism 76 in response to a control signal sent from the main controller 10. The touch panel 80 includes touch sensors 82 on the front surface of a liquid crystal display (LCD) panel of an LCD module 81.

The main controller 10 is further coupled to a FAX communication section 120 and a local area network (LAN) communication section 130 through the data bus 30. The main controller 10 transmits and receives a fax and controls LAN-based communication. The main controller 10 also receives manipulation signals generated by button switches disposed on the front side on the top surface of the main body 2.

2. Structure of the Main Controller

As illustrated in FIG. 3, the main controller 10 has a central processing unit (CPU) 20, a read only memory (ROM) 11, and a random access memory (RAM) 12. The main controller 10 further has a flash memory 13, an interface circuit 14, and the like. The flash memory 13 is equivalent to an example of a storage section or a non-volatile memory. The RAM 12 is equivalent to an example of a storage section or a volatile memory.

When the CPU 20 reads control programs for the printing apparatus 1 from the ROM 11 and executes these programs, the CPU 20 functions as a print controller 21, a display controller 22, and a selected size storage section 23. In another embodiment described later, the CPU 20 also functions as a print history information storage section 24 and a paper size selection frequency recognizer 25, which are indicated by dotted lines.

The print controller 21 controls paper supply from the MP tray 90, A-tray 100, and B-tray 110 to the printer unit 75, controls printing by the printer unit 75 on paper P, and performs other control functions. The display controller 22 controls screen displays on the touch panel 80. According to results of detections by the paper width sensor 95 and paper length sensor 93, the display controller 22 also recognizes the classification, which is any one of D1 to D8, of the paper P set in the MP tray 90, as indicated in a classification table 200 for paper sizes in FIG. 4.

As the width of paper P set in the MP tray 90 becomes large, the value indicated by a detection signal from the paper width sensor 95 changes from "0, 0" through "0, 1" and "1, 0" to "1, 1". A detection signal from the paper length sensor 93 is at 0 when no paper P is detected and at 1 when paper P is detected.

According to a combination of the values of the detection signals from the paper width sensor 95 and paper length sensor 93, the display controller 22 decides the paper size classification, which is any one of D1 to D8, of the paper P set in the MP tray 90, as indicated in the classification table 200 in FIG. 4. When a plurality of candidate sizes are set for the decided paper size classification, the display controller 22 displays, on the touch panel 80, a paper size selection screen 300 on which the size of the paper P that is actually set is selected from the plurality of candidate sizes.

Figure 5:
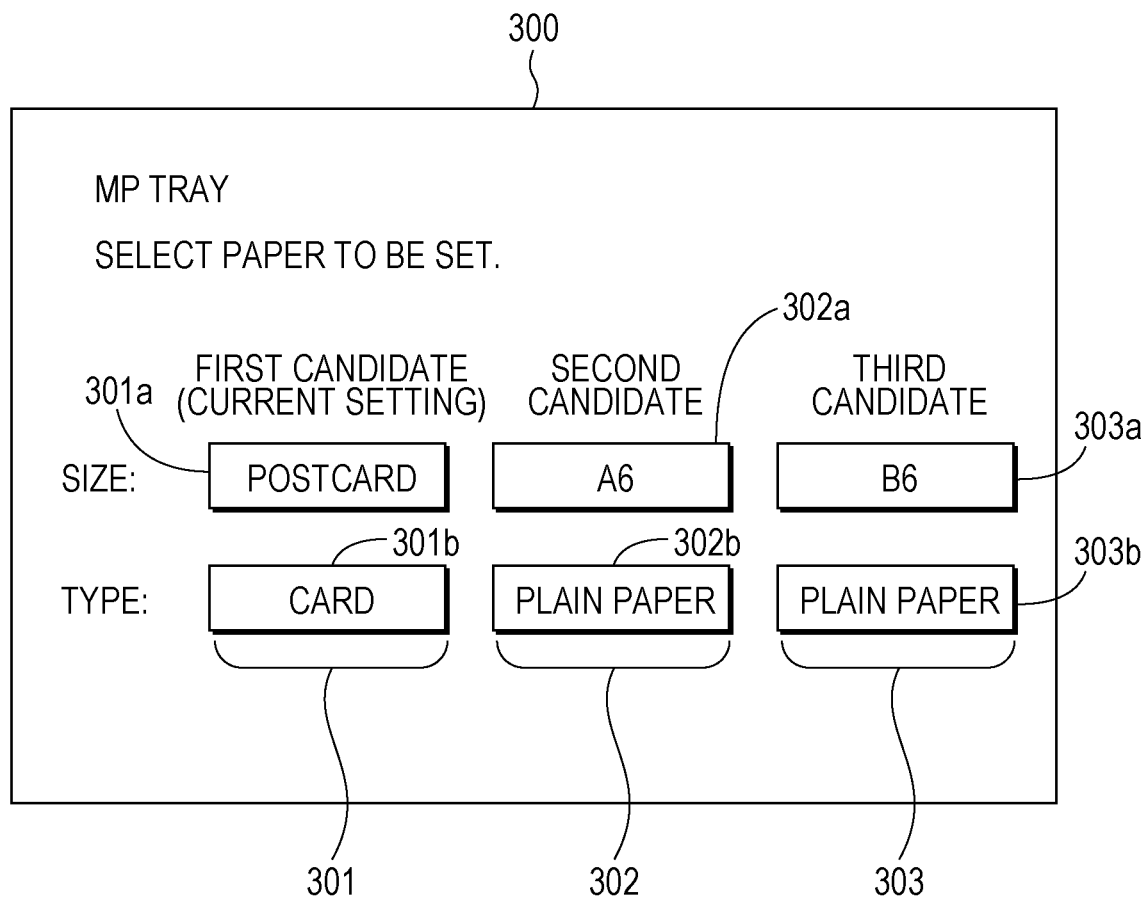
FIG. 5 illustrates a paper size selection screen.

FIG. 5 illustrates a display example of the paper size selection screen 300 when the size of the paper P set in the MP tray 90 is classified as D3. A first candidate selection portion 301, a second candidate selection portion 302, and a third candidate selection portion 303 are displayed on the paper size selection screen 300. The first candidate selection portion 301 includes a selection button 301a for a first candidate paper size and a type button 301b. Similarly, the second candidate selection portion 302 includes a selection button 302a for a second candidate paper size and a type button 302b, and the third candidate selection portion 303 includes a selection button 303a for a third candidate paper size and a type button 303b.

The user can select the size of the paper P set in the MP tray 90 by touching the selection button 301a in the first candidate selection portion 301, the selection button 302a in the second candidate selection portion 302, or the selection button 303a in the third candidate selection portion 303 accordingly. The user can also select the type of each paper sheet P by touching the type button 301b in the first candidate selection portion 301, the type button 302b in the second candidate selection portion 302, or the type button 303b in the third candidate selection portion 303 accordingly.

The selected size storage section 23 stores, in the flash memory 13, paper selection information in which the paper size selected by the user on the paper size selection screen 300 is related to the paper size classification. When initialization processing to restore the settings of the printing apparatus 1 to its factory settings is executed through the manipulation of a button switch 140, the selected size storage section 23 deletes the paper selection information stored in the flash memory 13.

3. Processing to Determine a Paper Size

Figure 6:
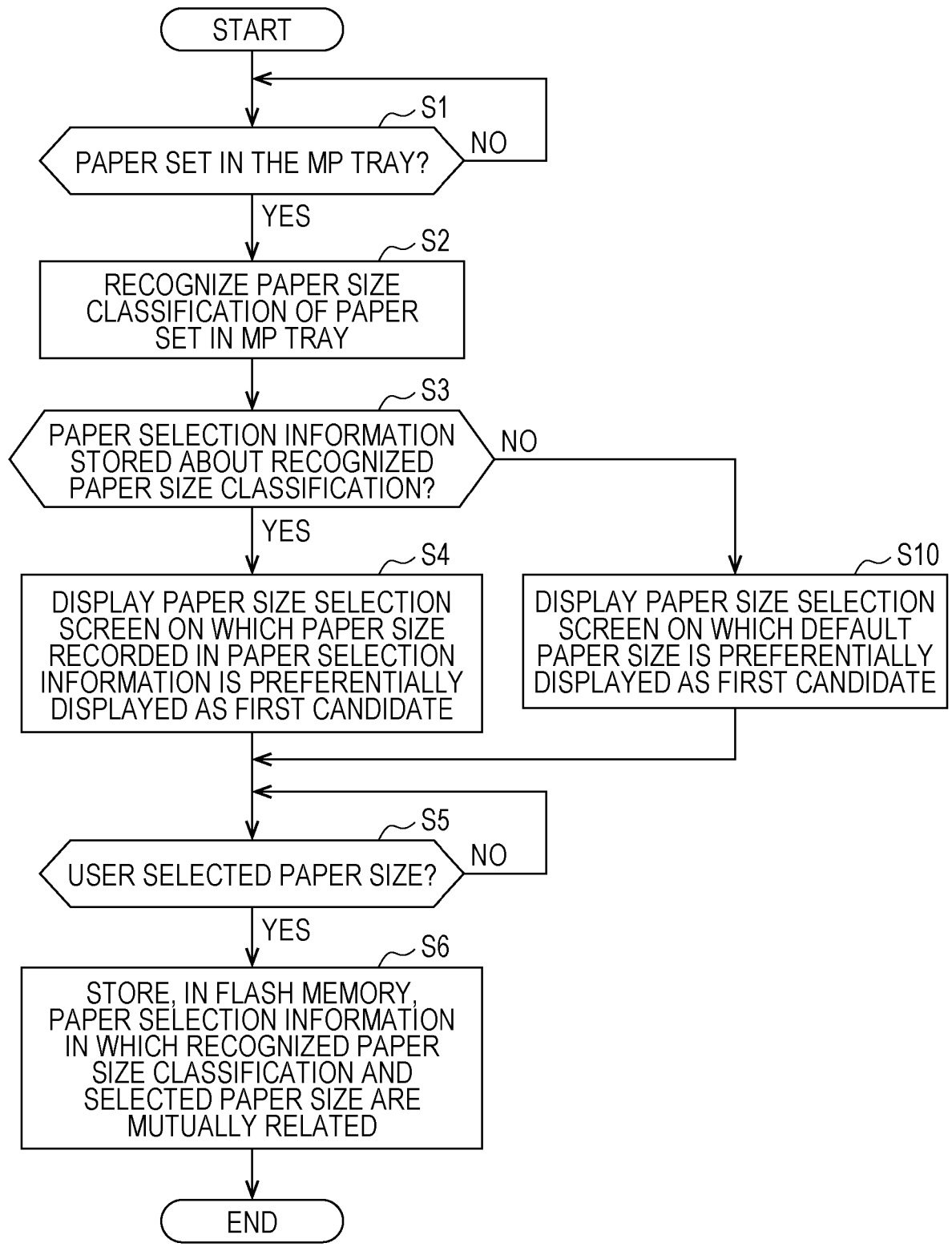
FIG. 6 is a flowchart of processing to store the paper size of paper set in the MP tray.

Processing to determine the size of paper P set in the MP tray 90 according to the manipulation by the user will be described with reference to the flowchart illustrated in FIG. 6. When, in step S1 in FIG. 6, the display controller 22 detects, from a detection signal from the paper presence/absence sensor 94, that paper P has been set in the MP tray 90, the display controller 22 causes processing to proceed to step S2.

Processing in step S2 and later may be executed each time the paper width detected by the paper width sensor 95 is switched from a first paper width to a second paper width. In this case, the paper size selection screen 300 for the paper size classification corresponding to the second paper width is displayed on the touch panel 80 in processing in step S2 and later. In a case in which the paper width detected by the paper width sensor 95 is a third paper width, processing in step S2 and later may be executed when the user performs a manipulation to generate a command to display the paper size selection screen 300 and the display controller 22 accepts this command. In this case, the paper size selection screen 300 for the paper size classification corresponding to the third paper width is displayed on the touch panel 80 in processing in step S2 and later.

In step S2, according to a combination of the values of the detection signals from the paper width sensor 95 and paper length sensor 93, the display controller 22 recognizes the paper size classification of the paper P set in the MP tray 90, as indicated in the classification table 200 for paper sizes in FIG. 4. In step S3 that follows, the display controller 22 decides whether paper selection information about the recognized paper size classification is stored in the flash memory 13.

When paper selection information is stored, the display controller 22 causes processing to proceed to step S4. When no paper selection information is stored, the display controller 22 causes processing to proceed to step S10. In step S4, the display controller 22 displays, on the touch panel 80, the paper size selection screen 300 on which the paper size recorded in the paper selection information is preferentially displayed as a first candidate. The display controller 22 then causes processing to proceed to step S5.

When the paper size selection screen 300 on which the paper size recorded in the paper selection information is preferentially displayed is displayed on the touch panel 80 as described above, the user can easily perform a selection manipulation to change the size of paper P to be set in the MP tray 90. That is, in a case in which the user frequently switches the size of paper P to be set in the MP tray 90, the paper size selection screen 300 on which the size of the previously set paper P is preferentially displayed is displayed on the touch panel 80 at the time of a switchover. Therefore, the user can easily make a switchover to select the size of paper P to be set in the MP tray 90 by selecting the preferentially displayed paper size. This can reduce cumbersomeness in the user's manipulation to restore the previous paper size and can improve the usability of the printing apparatus 1.

In step S10, the display controller 22 displays, on the touch panel 80, the paper size selection screen 300 on which a paper size set by default is preferentially displayed as a first candidate, after which the display controller 22 causes processing to proceed to step S5. As the default paper size (initial paper size), "postcard", for example, is set for the paper size classification D3.

In step S5, the display controller 22 decides whether the user has selected a paper size. When the display controller 22 decides that the user has selected a paper size, the display controller 22 causes processing to proceed to step S6. In step S6, the selected size storage section 23 stores, in the flash memory 13, paper selection information in which the paper size classification recognized in step S23 and the paper size selected by the user are mutually related.

On the paper size selection screen 300 displayed in step S4, the paper size recorded in the paper selection information may be displayed at the highest priority, and the default paper size may be displayed at the next highest priority. When there is a match between the default paper size and the paper size recorded in the paper selection information (the paper size is equivalent to an example of a fourth paper width), the default paper size may not be displayed as a candidate on the paper size selection screen 300.

4. Other Embodiments

In the above embodiment, paper selection information has been stored in the flash memory 13 by the selected size storage section 23. However, paper selection information may be stored in the RAM 12. In this case, however, when power supply to the main body 2 is shut off or the main body 2 shifts to the power-saving mode and a power supply voltage to the RAM 12 drops to or below a predetermined level, paper selection information stored in the RAM 12 is lost.

In the above embodiment, paper selection information had been stored in the flash memory 13 by the selected size storage section 23, after which the paper size selection screen 300 on which the paper size recorded in the paper selection information is preferentially displayed as a first candidate has been displayed on the touch panel 80. As another configuration, however, the print history information storage section 24 and paper size selection frequency recognizer 25 may be included.

The print history information storage section 24 stores, in the flash memory 13, print history information in which the number of print jobs executed in response to paper supply from the MP tray 90 is recorded for each paper size. FIG. 7 illustrates an example of print history information. In the print history information 210 in FIG. 7, the number of print job executions in each paper size in the previous one week is recorded for each of the paper size classifications D1 to D8. However, the number of printed paper sheets in each paper size may be recorded instead of the number of print jobs.

The paper size selection frequency recognizer 25 references the print history information stored in the flash memory 13 and recognizes the selection frequencies of the paper sizes corresponding to the paper size classification that is currently set for the MP tray 90. When paper P is set in the MP tray 90, the display controller 22 displays, on the touch panel 80, the paper size selection screen 300 on which the paper size with the highest selection frequency is preferentially displayed as a first candidate. In this configuration, since the paper size that the user is most likely to select again is preferentially displayed, the user can easily select a paper size. This can reduce cumbersomeness in the user's manipulation to restore the previous paper size and can improve the usability of the printing apparatus 1.

Each time a paper size classification is changed due to a switchover of the paper width detected by the paper width sensor 95 from the first paper width to the second paper width, the display controller 22 may display, on the touch panel 80, the paper size selection screen 300 for the new paper size classification. In this case, when print history information about the paper size classifications for the second paper width is stored in the flash memory 13, the display controller 22 displays the paper size selection screen 300 in a preferential display manner according to the print history information about the paper size classifications for the second paper width.

In a case in which the paper width detected by the paper width sensor 95 is the third paper width, when the display controller 22 accepts a command to display the paper size selection screen 300, the display controller 22 decides whether print history information about the paper size classifications for the third paper width is stored. When such print history information is stored in the flash memory 13, the display controller 22 displays, on the touch panel 80, the paper size selection screen 300 about the paper size classifications corresponding to the third paper width in a preferential display manner according to the print history information about the paper size classifications for the third paper width.

In the above embodiment, as the preferential display manner on the paper size selection screen 300, an example has been taken in which the paper size recorded in paper selection information or the paper size with the highest selection frequency recognized by the paper size selection frequency recognizer 25 is indicated as a first candidate. However, as another preferential display manner, a paper size to be prioritized may be indicated in a different color or size from other candidate paper sizes or a display portion for a paper size to be prioritized may be caused to blink, for example.

In the above embodiment, the MP tray 90 has been taken as an example of a paper tray. However, the present disclosure can also be applied to cassette-type paper trays such as an A-tray 100 and a B-tray 110. As for a cassette-type paper tray, it suffices to detect the width of set paper according to the positions of edge guides provided in the cassette.

In the above embodiment, paper size classifications have been set according to the widths and lengths of paper sheets P that are determined according to results of detections by the paper width sensor 95 and paper length sensor 93 included in the MP tray 90, as illustrated in FIG. 4. In another configuration, however, the paper length sensor 93 may be omitted and only the paper width sensor 95 may be provided. In this case, paper size classifications are set according to only the widths of paper sheets P.

At least part of the functional blocks illustrated in FIG. 3 may be implemented by hardware or in collaboration of hardware and software. These functional blocks are not limited to a structure in which independent hardware resources are disposed as illustrated in the drawing. Programs executed by the CPU 20 may be stored in a storage device structured separately from the printing apparatus 1, without being limited to the ROM 11. Alternatively, the CPU 20 may fetch programs stored in an external device and may execute the fetched programs.

In addition, specific details of the structure of each portion of each unit included in the printing apparatus 1 can be arbitrarily modified without departing from the intended scope of the present disclosure.

What is claimed is:

1. A printing apparatus having a display unit, the apparatus comprising:
   a paper tray having an edge guide that guides one edge of paper in a width direction of the paper, the width direction intersecting a transport direction of the paper;
   a detector configured to detect a paper width of paper adapting to the paper tray according to a position of the edge guide;
   a display controller configured to display, on the display unit, a paper size selection screen on which a plurality of candidate paper sizes corresponding to the paper width detected by the detector are displayed; and
   a storage section configured to store paper selection information in which the paper width and a paper size selected on the paper size selection screen are mutually related,
   wherein:
   when the paper width detected by the detector is switched from a first paper width to a second paper width, the display controller displays, on the display unit, the paper size selection screen corresponding to the second paper width; and
   when second paper selection information related to the second paper width is stored in the storage section, the display controller displays, on the display unit, the paper size selection screen corresponding to the second paper width in a manner in which a paper size related to the second paper width in the second paper selection information is preferentially displayed over another candidate paper size.

2. The printing apparatus according to claim 1, wherein when the paper width detected by the detector is a third paper width and the display controller accepts a command to display the paper size selection screen in a state in which third paper selection information related to the third paper width is stored in the storage section, the display controller displays, on the display unit, the paper size selection screen corresponding to the third paper width in a manner in which a paper size related to the third paper width in the third paper selection information is preferentially displayed over another candidate paper size.

3. The printing apparatus according to claim 2, wherein when the paper width detected by the detector is a fourth paper width and fourth paper selection information related to the fourth paper width is not stored in the storage section, the display controller displays, on the display unit, the paper size selection screen corresponding to the fourth paper width in a manner in which an initial paper size, which is set in advance, is preferentially displayed over another candidate paper size.

4. The printing apparatus according to claim 3, wherein when the paper width detected by the detector is the fourth paper width and the fourth paper selection information is stored in the storage section, the display controller displays, on the display unit, the paper size selection screen corresponding to the fourth paper width in a manner in which a paper size related to the fourth paper width in the fourth paper selection information, the initial paper size, and another candidate paper size are is preferentially displayed in this order.

5. The printing apparatus according to claim 3, wherein when the paper width detected by the detector is the fourth paper width, the fourth paper selection information is stored in the storage section, and there is a match between the initial paper size and the paper size related to the fourth paper width in the fourth paper selection information, the display controller does not display the initial paper size on the paper size selection screen corresponding to the fourth paper width as a candidate paper size.

6. The printing apparatus according to claim 1, wherein:
   the storage section is a non-volatile memory; and
   when initialization processing to restore a setting of the printing apparatus to a factory setting is executed, the paper selection information stored in the storage section is deleted.

7. The printing apparatus according to claim 1, wherein:
   the storage section is a volatile memory; and
   when the printing apparatus is powered off or when the printing apparatus shifts to a power-saving mode and a power supply voltage to the storage section drops to or below a predetermined level, the paper selection information stored in the storage section is deleted.

8. A printing apparatus having a display unit, the apparatus comprising:
   a paper tray having an edge guide that guides one edge of paper in a width direction of the paper, the width direction intersecting a transport direction of the paper;
   a detector configured to detect a paper width of paper adapting to the paper tray according to a position of the edge guide;
   a display controller configured to display, on the display unit, a paper size selection screen on which a plurality of candidate paper sizes corresponding to the paper width detected by the detector are displayed; and
   a storage section configured to store paper selection information in which the paper width and a paper size selected on the paper size selection screen are mutually related,
   wherein:
   the storage section stores print history information in which the number of paper sheets supplied from the paper tray or the number of print jobs executed in response to paper supplied from the paper tray is recorded so as to be classified according to the paper width detected by the detector;
   a paper size selection frequency recognizer is provided that recognizes selection frequencies of the candidate paper sizes corresponding to the paper width with reference to the print history information; and
   the display controller displays the paper size selection screen on the display unit according to the selection frequencies of the candidate paper sizes, the selection frequencies being recognized by the paper size selection frequency recognizer, in a manner in which the paper size with the highest selection frequency is preferentially displayed over another candidate paper size.

9. The printing apparatus according to claim 8, wherein when the paper width detected by the detector is switched from a first paper width to a second paper width, the display controller displays, on the display unit, the paper size selection screen corresponding to the second paper width, according to the print history information for the second paper width.

10. The printing apparatus according to claim 9, wherein when the paper width detected by the detector is the third paper width and the display controller accepts a command to display the paper size selection screen, the display controller displays, on the display unit, the paper size selection screen corresponding to the third paper width according to the print history information for the third paper width.

* * * * *